(12) United States Patent
Reidt

(10) Patent No.: US 10,681,549 B2
(45) Date of Patent: Jun. 9, 2020

(54) SWITCHING APPARATUS WITH RADIO MODULE AND DEACTIVATION FUNCTION

(71) Applicant: EATON ELECTRICAL IP GMBH & CO. KG, Schoenefeld (DE)

(72) Inventor: Georg Reidt, Swisstal (DE)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 14/417,804

(22) PCT Filed: Jul. 26, 2013

(86) PCT No.: PCT/EP2013/065844
§ 371 (c)(1),
(2) Date: Jan. 28, 2015

(87) PCT Pub. No.: WO2014/019963
PCT Pub. Date: Feb. 6, 2014

(65) Prior Publication Data
US 2015/0208241 A1 Jul. 23, 2015

(30) Foreign Application Priority Data

Jul. 30, 2012 (DE) .................. 10 2012 106 923

(51) Int. Cl.
| | |
|---|---|
| *H04W 4/80* | (2018.01) |
| *H01H 71/04* | (2006.01) |
| *H04W 12/08* | (2009.01) |
| *H04W 84/12* | (2009.01) |

(52) U.S. Cl.
CPC ............ *H04W 12/08* (2013.01); *H01H 71/04* (2013.01); *H04W 4/80* (2018.02); *G08C 2201/00* (2013.01); *G08C 2201/12* (2013.01); *G08C 2201/50* (2013.01); *H01H 2300/03* (2013.01); *H04W 84/12* (2013.01); *Y02B 90/224* (2013.01); *Y04S 20/14* (2013.01)

(58) Field of Classification Search
CPC .................................................. H04W 12/08
See application file for complete search history.

(56) References Cited

U.S. PATENT DOCUMENTS

| | | | |
|---|---|---|---|
| 5,682,476 A | 10/1997 | Tapperson et al. | |
| 2003/0043052 A1 | 3/2003 | Tapperson et al. | |
| 2005/0020207 A1* | 1/2005 | Hamada ............. | H04M 1/6066 455/41.2 |
| 2006/0119344 A1 | 6/2006 | Benke et al. | |

(Continued)

FOREIGN PATENT DOCUMENTS

| | | |
|---|---|---|
| CN | 1170464 A | 1/1998 |
| CN | 2831619 Y | 10/2006 |

(Continued)

*Primary Examiner* — Idowu O Osifade
(74) *Attorney, Agent, or Firm* — Leydig, Voit & Mayer, Ltd.

(57) ABSTRACT

A switching apparatus has a switching device and a radio module. The radio module is provided for the purpose of making available a piece of information about an operating state of the switching device in wirelessly retrievable fashion. The switching apparatus is distinguished at least in that the switching apparatus has a manual operating element that can be used to physically deactivate the radio module.

9 Claims, 2 Drawing Sheets

(56) References Cited

U.S. PATENT DOCUMENTS

| | | |
|---|---|---|
| 2006/0176630 A1 | 8/2006 | Carlino et al. |
| 2008/0018426 A1 | 1/2008 | Liu |
| 2009/0023389 A1* | 1/2009 | Paryani ............... H04B 1/202 |
| | | 455/41.2 |
| 2012/0048983 A1* | 3/2012 | Bianco ............... B60L 11/1818 |
| | | 242/388.9 |
| 2012/0080944 A1* | 4/2012 | Recker ............... H05B 37/0218 |
| | | 307/25 |
| 2012/0310463 A1* | 12/2012 | Jeong ............... H02J 7/0004 |
| | | 701/22 |

FOREIGN PATENT DOCUMENTS

| | | |
|---|---|---|
| CN | 101379448 A | 3/2009 |
| DE | 102004002330 A1 | 8/2005 |
| DE | 102007010482 A1 | 9/2007 |
| TW | 201034042 A | 9/2010 |
| TW | 201034042 A1 | 9/2010 |
| WO | WO 2007087657 A1 | 8/2008 |

* cited by examiner

SWITCHING APPARATUS WITH RADIO MODULE AND DEACTIVATION FUNCTION

CROSS-REFERENCE TO RELATED APPLICATIONS

This application is a U.S. National Stage application under 35 U.S.C. § 371 of International Application No. PCT/EP2013/065844, filed on Jul. 26, 2013, and claims benefit to German Patent Application No. DE 10 2012 106 923.9, filed on Jul. 30, 2012. The International Application was published in German on Feb. 6, 2014, as WO 2014/019963 A1 under PCT Article 21(2).

FIELD

The invention relates to a switching apparatus having a switching device and a radio module.

BACKGROUND

Normally the radio model is used for monitoring or controlling the switching device. A person who is equipped with a suitable receiving device can retrieve the available information without having to come into direct contact with the control apparatus. A complex structure of a wired bus system can be omitted. Moreover, in an emergency an appropriate message can be transmitted automatically to the receiving device using the radio module and the competent person can therefore be reached irrespective of where they are.

A switching apparatus of this kind is described in DE 10 2004 002 330 A1. The switching device of the switching apparatus is arranged in a control cabinet. A radio interface is connected to the switching device and is provided for the purpose of exchanging information regarding the operating state of the switching device with an appropriate radio interface of the receiving device.

In particular, the switching apparatus disclosed in DE 10 2004 002 330 A1 is permanently able to communicate. This is, however, associated with disadvantages. The radio module that is permanently able to communicate can be manipulated by unauthorised access. For example, data stored in the radio module could be read wrongfully. Moreover, the communication between the radio module and the receiving device could be followed. Critical malfunctions of the switching apparatus could be brought about by access to the data transmission or the radio module respectively. The security of the switching apparatus and in some circumstances a whole system connected to the switching apparatus is thus compromised.

SUMMARY

An aspect of the invention provides a switching apparatus, comprising: a switching device; a manual operating element; and a radio module. A piece of information about an operating state of the switching device can be retrieved wirelessly using the radio module. The manual operating element is configured to physically deactivate the radio module.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
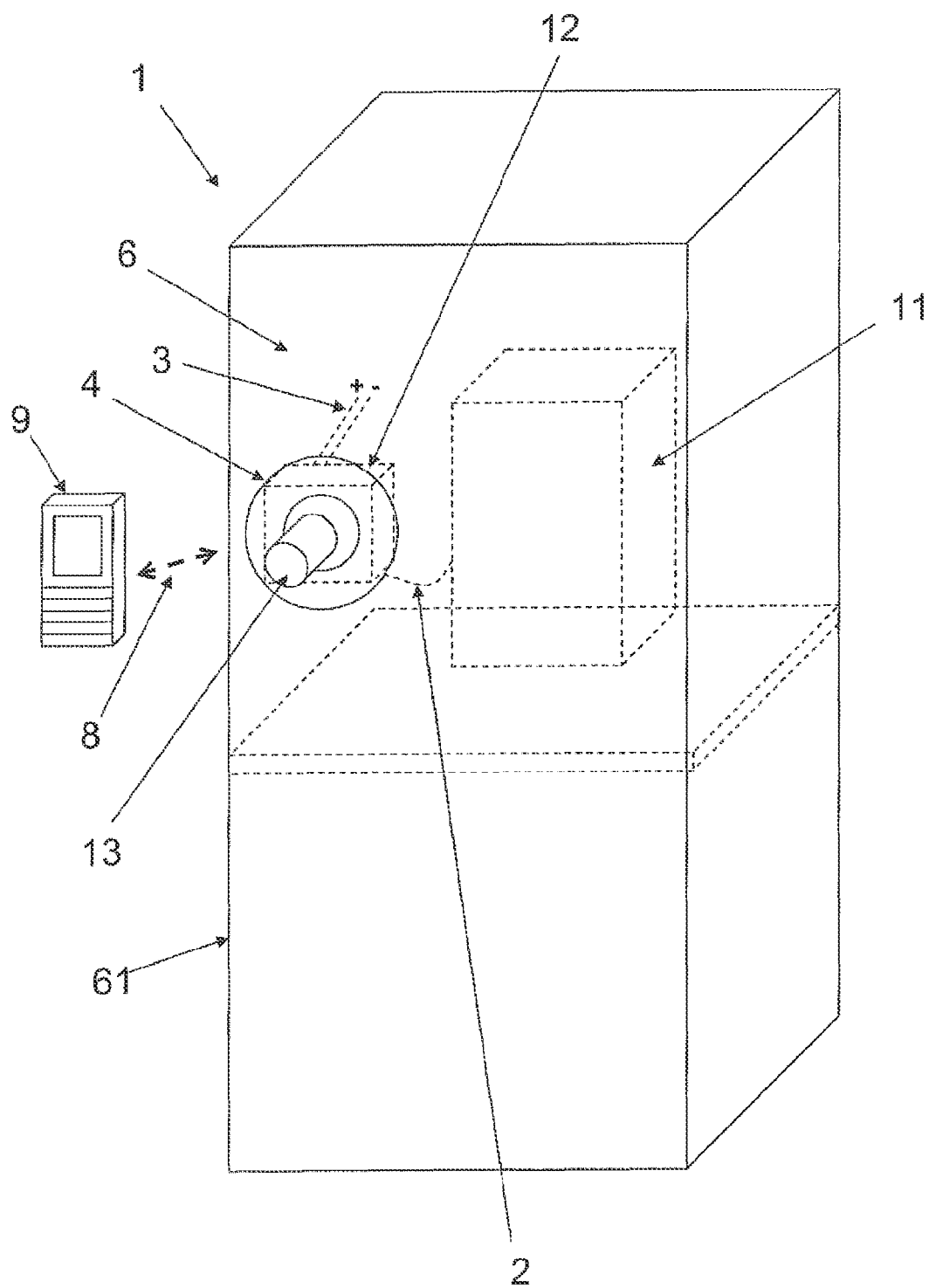
FIG. 1 is a schematic outline of an embodiment of a switching apparatus according to the invention.

An aspect of the invention is to improve the IT security of the switching apparatus of the type in question.

An aspect of the invention provides a switching apparatus having a switching device and a radio module. The radio module may be provided for the purpose of making available a piece of information about an operating state of the switching device in wirelessly retrievable fashion.

The switching apparatus according to the invention is accordingly characterized in that the switching apparatus comprises a manual operating element that can be used to physically deactivate the radio module. According to the invention, therefore, the radio module only provides operating information regarding the switching device in a wireless fashion until the radio module has been put out of operation (deactivated). The physical deactivation should be taken to mean that the radio module is switched off, for example by means of a mechanical or galvanic interruption of a suitable power line. A switching of the radio module by means of programming technology is also feasible, for example by setting a bit/control pin provided for the purpose, as a result of which an internal switch of the radio module suitable for deactivating the radio module is operated. If the radio module is switched off in this manner there is no possibility of receiving information about the switching device via the radio module.

According to the invention, the radio module can be deactivated by means of a manual operation of the operating element. By configuring the operating element in a manner that is suitable for manual operation, for example in the form of a pushbutton, a rotary knob, a switch lever or the like, it is ensured that the deactivation cannot be performed by means of external, unauthorised access by means of software technology. The user can therefore decide himself whether or not the switching apparatus can be reached by means of wireless communication.

According to an embodiment of the invention, the deactivated radio module can likewise be brought, by means of the operating element, back into an active operating state, in which data transmission of the operating information of the switching device can take place.

An additional advantage of being able to physically deactivate the radio module is that the energy consumption of the switching apparatus can be reduced by deactivating the radio module.

According to an embodiment of the invention, the radio module is designed as an external unit. In this embodiment, the radio module can be arranged separately from the switching device, for example at a place that is suitable for wireless communication. The radio module is designed such that it can be connected to the switching device in order to facilitate the exchange of data between the radio module and the switching device. The connection can be wired or wireless. It can, for example, be achieved in the form of an Ethernet cable or another suitable type of connection.

Furthermore, the radio module can be designed such that it is suitable to receive and/or process a control signal transmitted by a transmitter and/or to relay a control signal to the switching device. The switching apparatus can thus not only be monitored in a wireless manner but also controlled in a wireless manner.

Bluetooth or another accordingly suitable radio standard can be used for communication between the radio module and the receiving device/transmitter. The radio module can also comprise a WLAN interface or a comparable interface. The receiving/transmitting device can, for example, be achieved by a smartphone, tablet PC, pager or a similar device having the appropriate programming.

It can be advantageous if the information about the operating state of the switching device can then also be provided by the radio module when the switching device is tripped or is subject to a malfunction. In the event of tripping, for example overload tripping, and/or malfunction, an energy supply of the switching device is interrupted in some circumstances. Therefore, the radio module can be equipped with an energy supply, which is independent of the energy supply of the switching device. This can be provided, for example, by means of a separate GND/+24 V DC connection on the radio module. If the energy supply of the switching device fails, the radio module can continue to be supplied with energy, for example electricity, by the separate energy supply. Furthermore, the radio module can in this case continue to supply energy to the switching device via its own input energy supply and thus continue to retrieve data from the switching device that has been switched off.

According to a further embodiment of the invention, the radio module comprises a display element. The display element can be provided in order to present the information about the operating state of the switching device visually. The display element can comprise a multicolour LED, which is suitable for emitting light in different colours. The colour display of the display element can depend on an operating parameter of the switching device. For example, a green light colour can indicate a regular state of the switching device while a red light colour can signal a tripped state of the switching device or a malfunction. Furthermore, a static glow and/or glow that changes over time can be displayed. A flashing of the display element can, for example, indicate a predetermined operating state of the switching device. By using a wide spectrum of colours that can be shown by the display element, (for example from green via blue, yellow and orange to red) a display of the operating state that is intuitive to the human eye can be achieved in the process, in particular if it is combined with the brightness of the display changing over time.

In addition to the display element, the radio module can comprise a reference ring. The reference ring serves to visualise the dependency of the colour display of the display element on the operating parameter of the switching device. This illustration is intended to facilitate an interpretation of the signal emitted by the display element. The reference ring can be achieved in the form of an assignment, in tabular form, of colours to operating states. The reference ring can be achieved as a round or differently shaped, for example oval or square-shaped, perforated disc depending on the application, the disc containing the required information about the colour display and the assignment of the operating parameters in written and/or pictorial form. Moreover, the reference ring can be arranged in the direct proximity of the display element, for example over it, under it or behind it, such that the light signal displayed by the display element can be perceived together with the assignment information shown by the reference ring.

In order to improve the wireless communication between the radio module and the receiving device/transmitter, it can be advantageous to provide the radio module with an antenna, which is arranged behind the reference ring. As a result of this, the wireless retrievability of the operating information is not discernible to the human eye at first glance. According to one embodiment, the antenna is achieved in the form of an adhesive film. The antenna can be connected directly to the reference ring. In this manner the reference ring, which is produced from plastics material for example, can be installed by the user together with the antenna, which has already been stuck onto said ring. As a result of this, the user can save one work step (mounting of the antenna) and moreover, does not need to worry about a suitable arrangement of the antenna.

In some fields of application of the switching apparatus it can be advantageous for the switching apparatus to comprise a control cabinet having a control cabinet housing. The switching device is then arranged inside the control cabinet and is thus protected by the control cabinet housing. Since the wireless transmission out of the control cabinet can be impeded by the control cabinet housing, the radio module is arranged on the control cabinet housing. The operating element is accordingly arranged in an appropriate manner such that it can be operated from outside of the control cabinet. In this manner the operating element can be manually operated without access to the devices inside the control cabinet. Irrespective of the arrangement of the operating element, the display element can also be arranged in such a way that the display of the operating state of the switching device can be seen from outside of the control cabinet. According to a further embodiment, the antenna can be integrated in the radio module, for example on a circuit board of the radio module, the radio module being configured such that the radio signals of the radio module can be emitted through an opening in the control cabinet housing.

According to an embodiment of the invention, the operating element can comprise an illuminated pushbutton. The illuminated pushbutton can also perform the function of the display element in order to simplify the construction of the switching apparatus. The illuminated pushbutton can be designed such that it can be seen from a position of the illuminated pushbutton if the radio module is deactivated. For example, the illuminated pushbutton can comprise a pushbutton, which can be depressed manually or not depressed. The illuminated pushbutton can be configured in such a way that the radio module is deactivated if the push button is depressed and if the push button is not depressed the wireless data transmission by means of the radio module is possible. A reversed configuration is also feasible. In this manner it is apparent whether the radio module is deactivated or not and specifically, irrespective of the colour display of the illuminated pushbutton and of the display element respectively. In another variant, the illuminated pushbutton can indicate whether the radio module is deactivated by suitable other visual means, for example by means of an LED, or an audible signal. The illuminated pushbutton and the display element can, of course, also be achieved as separate parts having this function.

Furthermore, it can be advantageous for the operating element to be equipped with means which facilitate a resetting or acknowledgement of an operating state of the switching device. This additional function expands the field of application of the switching apparatus and can facilitate a rapid reaction to tripping and/or malfunctions during the operation of the switching apparatus and all devices associated therewith.

A switching apparatus 1 according to the invention is shown in detail in FIG. 1. The switching apparatus 1 comprises a control cabinet 6 having a control cabinet housing 61. In the control cabinet 6 a switching device 11 is arranged such that the switching device is protected from external mechanical and electromagnetic effects by the control cabinet housing 61. The control cabinet housing 61 is designed such that a radio transmission of data out of the control cabinet 6 to the outside is suppressed. The elements of the switching apparatus 1 that are located inside the control cabinet 6 are each sketched with a broken line in FIG. 1 in order to illustrate their spatial arrangement.

Furthermore, the switching apparatus 1 comprises a radio module 12, which is arranged on and fixed to the control cabinet housing 61. In the process, the radio module 12 is designed as a separate unit and connected to the switching device 11 using a cable connection 2 such that an exchange of information between the radio module 12 and the switching device 11 is possible. The radio module 12 protrudes partially out of the control cabinet 6.

The radio module 12 makes information about an operating state of the switching device 11, which can be transmitted via the connection 2, available for retrieval. A receiving device 9 can enter into a wireless connection, which is labelled in FIG. 1 with a double arrow 8, with the radio module 12, and retrieve the information from the radio module. Moreover, the receiving device 9 can function as a transmitter and send signals, for example control signals, to the radio module 12 by using the wireless connection.

The radio module 12 is equipped with an energy supply 3, which is independent of the energy supply of the switching device 11, in order to ensure the operability of the radio module 12 in the tripped state of the switching device 11. Moreover, the switching device 11 can continue to be supplied with energy in the tripped state by the energy supply 3 of the radio module 12 such that information about the operating state of the switching device 11 can still be retrieved in this case.

Furthermore, the switching apparatus 1 comprises an operating element 13, which is integrated in the radio module 12 in this embodiment. The operating element 13 is designed in the form of a pushbutton. If the pushbutton is pressed it locks in a predetermined pressed position. In this position of the pushbutton the radio module 12 is in operation. Data transmission between the radio module 12 and the device 9 can be carried out. If the pushbutton is not depressed, the energy supply of the radio module 12 is interrupted and the radio module is thus deactivated.

A reference ring 4 is provided on the radio module 12. The reference ring 4 has the form of a perforated round disc, which is arranged in direct proximity to the display element.

Figure 2:
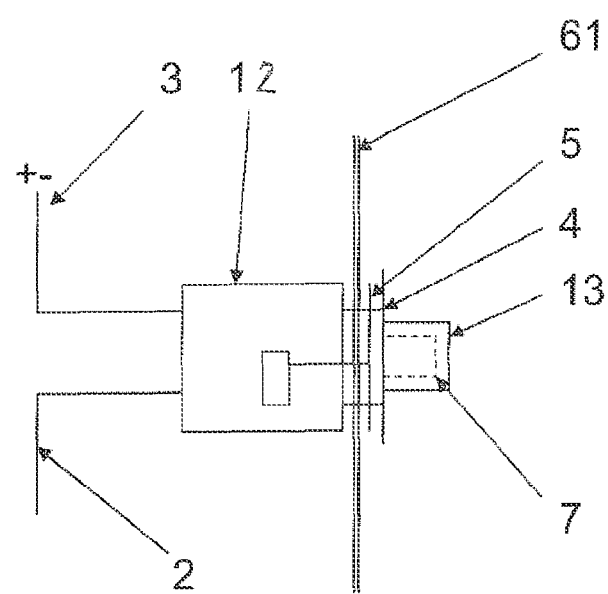
FIG. 2 is a schematic outline of a partial view of the switching apparatus from FIG. 1.

FIG. 2 is a detailed partial view of the switching apparatus from FIG. 1. Same or similar parts have been provided with the same reference numerals in FIGS. 1 and 2 in the process.

In FIG. 2, the radio module 12 is shown in a transverse view, the radio module 12 being arranged on the control cabinet housing 61 such that it protrudes in part on the control cabinet. The radio module 12 has access to its own energy supply 3 as well as a cable connection 2 to the switching device 11 (not shown in FIG. 2).

Furthermore, a display element 7 is provided on the radio module 12. The display element 7 (not visible in FIG. 1) comprises an RGB LED, which is incorporated into the operating element 13. In the process, the operating element 13 is formed partly from transparent material such that the light emitted from the RGB LED is visible from outside. Moreover, the reference ring 4 is arranged in direct proximity to the display element 7 and is provided to illustrate the dependence of the colour display of the display element 7 on the operating state of the switching device 11 graphically in the form of an assignment table.

Furthermore, the radio module 12 comprises an antenna 5, which is arranged in part between the reference ring 4 and the control cabinet housing 61. The antenna is not visible to an observer located outside of the control cabinet 6, since it is preferably fully covered by the reference ring 4.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

LIST OF REFERENCE NUMERALS

1 Apparatus
11 Switching device
12 Radio module
13 Operating element
2 Connection
3 Energy supply
4 Reference ring
5 Antenna
6 Control cabinet
61 Control cabinet housing
7 Display element
8 Double arrow
9 Receiving device

The invention claimed is:
1. A switching apparatus, comprising:
a control cabinet that includes a control cabinet housing;
a switching device disposed within the control cabinet housing; and
a radio module disposed on the control cabinet housing, the radio module including a manual operating element disposed thereon, the manual operating element being configured to be switchable between a first position to place the radio module in a physically deactivated state and a second position to place the radio module into an active operating state; and a cable connection connecting the switching device to the radio module, the cable connection being configured to exchange information between the switching device and the radio module, wherein the radio module, in the active operating state, is configured to wirelessly convey an operating state of the switching device, wherein the radio module, in the physically deactivated state, is switched off so as to be incapable of wirelessly conveying information about the switching device, wherein the manual operating element is configured to be switchable between the first position and the second position from outside the control cabinet housing, and wherein the radio module includes a radio module energy supply configured to supply energy to the switching device such that the radio module continues to retrieve information from the switching device when the switching device has been switched off, and, in event of an interruption of an energy supply of the switching device, to:
supply energy to the radio module, and
supply energy to the switching device such that information about the operating state of the switching device remains retrievable by the radio module.

2. The switching apparatus of claim 1, wherein the radio module is configured as an external unit that can be connected to the switching device.

3. The switching apparatus of claim 1, wherein the radio module is configured to transmit a control signal to the switching device.

4. The switching apparatus of claim 1, further comprising:
a display element disposed on the radio module, wherein the display element includes a multicolor LED, and wherein a color display of the multicolor LED depends on the operating state of the switching device.

5. The switching apparatus of claim 4, wherein the radio module includes a reference ring, and wherein the reference ring visualizes a dependence of the color display of the display element on the operating state of the switching device.

6. The switching apparatus of claim 5, further comprising:
an antenna disposed on the radio module, wherein the antenna is hidden behind the reference ring.

7. The switching apparatus of claim 1, wherein the manual operating element includes an illuminated pushbutton.

8. The switching apparatus of claim 1, wherein the manual operating element is configured to reset or acknowledge the operating state of the switching device.

9. The switching apparatus of claim 1, wherein the control cabinet housing is configured to impede wireless transmission into and out of the control cabinet housing.

* * * * *